June 22, 1926.
H. W. OLSEN
DEMOUNTABLE TIRE RIM
Filed Oct. 3, 1925
1,590,054
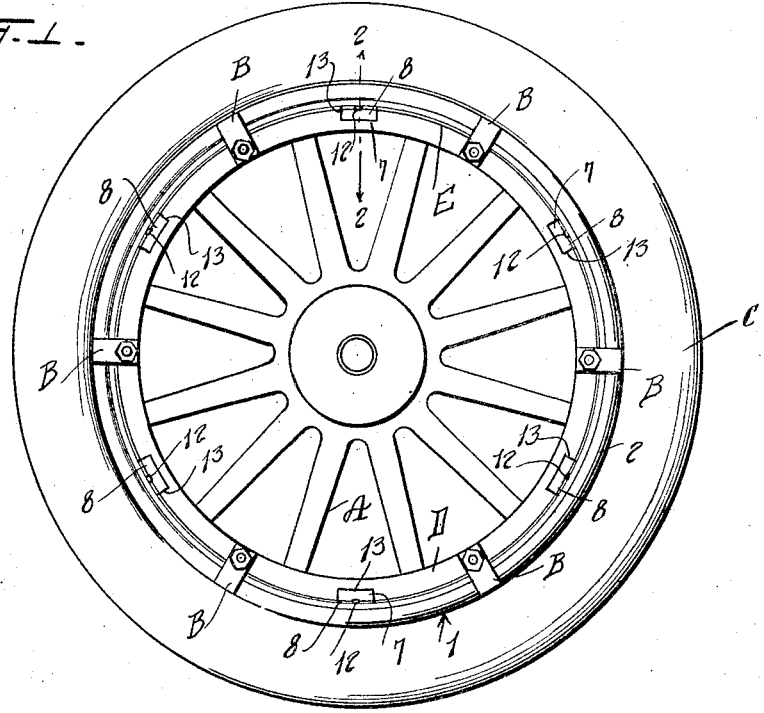
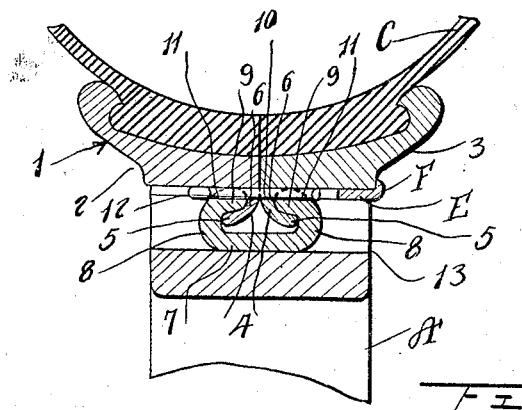
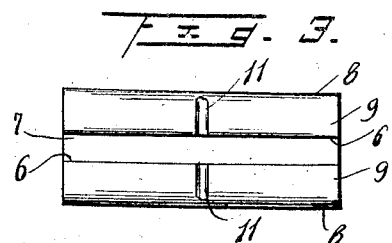
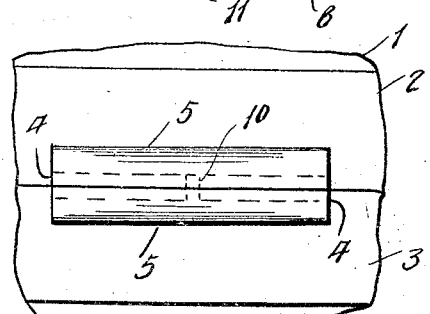
Inventor
H. W. Olsen.

Patented June 22, 1926.

1,590,054

UNITED STATES PATENT OFFICE.

HAROLD W. OLSEN, OF TACOMA, WASHINGTON.

DEMOUNTABLE TIRE RIM.

Application filed October 3, 1925. Serial No. 60,300.

The invention relates to means for mounting pneumatic and other tires on automobile and other vehicle wheels, and has for its object the provision of a rim made in two mating annular sections, and providing each section with integral flanges extending inwardly of the section in each instance and curved backwardly of the section, and providing channeled clamping members to engage said flanges having their edges turned inwardly to engage under the backwardly curved portions of the flanges, a cotter pin or other suitable member being inserted through an opening in each of the flanges and a groove in the clamping member to prevent accidental displacement of the clamping member.

The invention will be described in detail hereinafter and illustrated in the accompanying drawings, in which Figure 1 is a side view in elevation of a wheel showing the improved rim in position thereon, Figure 2 a transverse sectional view on a plane indicated by the line 2—2 of Figure 1, Figure 3 is a plan view of one of the clamping members, and Figure 4 is a fragmental view of the inner side of the rim showing the flanges.

In the drawings similar reference characters will be used to designate corresponding parts throughout the several views.

In Figure 1 a wheel A is shown on which the improved demountable rim 1 is in position, and held by clamping members B of the usual type, C indicating the pneumatic tire engaging the rim 1. The rim 1 is made up of two annular sections as shown clearly in Figure 2, said sections being designated 2 and 3 and each of said annular sections is provided with flanges 4 extending inwardly of the rim and curved away from one another and from the meeting edges of the sections as shown at 5, and thus forming recesses 6 between the outer curved portions 5 and the inner surface of the section. The clamping member comprises a plate 7 having its edges formed with upwardly curved flanges 8 and the edges of said flanges 8 curved toward one another as shown at 9 to engage in the recesses 6. The flanges 4 are provided with mating openings 10, and the clamping member 7 has oppositely disposed grooves 11 in the inwardly curved portion 9 that alines with the openings 10 in the flanges when the clamping member is in position to receive the cotter pin 12 or other suitable member to hold the clamping member in engagement with the flanges and thus lock the two sections 2 and 3 of the rim 1 together.

The felly D of the wheel A is provided with recesses 13 to receive the clamping members 7 when the rim and tire are mounted on the wheel. E indicates the usual felly band provided with a flange F to engage one side of the rim 1, the other side of the rim 1 being held in engagement with the wheel by means of the clamping members B heretofore described.

It will be apparent that when the device is assembled and placed on the wheel, as shown in Figures 1 and 2, the rim will be held effectually assembled by the clamping members engaging flanges 4 and also the flanges 4 and the clamping members will prevent circumferential movement of the rim 1 relatively to the flanged band E and the felly D.

What is claimed is:—

1. Means for clamping the two annular sections of a demountable rim, comprising mating flanges on the sections and extending inwardly thereof, said flanges having aligned openings therein, clamping members adapted to engage said mating flanges and provided with grooves to aline with said openings, and pins insertible through said openings and engaging said grooves to lock the clamping members on said flanges.

2. A demountable rim comprising two mating annular sections provided with mating, integral, backwardly curved flanges at intervals around them and interiorly thereof, clamping members adapted to engage said flanges, each of said clamping members including a plate having inwardly curved edges to engage within the backwardly curved flanges, said flanges having openings therein adapted to aline and the edges of the clamping members provided with grooves to aline with said openings, and pins insertable through said openings and engaging said grooves to lock the clamping members on said flanges.

In testimony whereof I affix my signature.

HAROLD W. OLSEN.